(12) United States Patent
Thomsen

(10) Patent No.: US 12,235,740 B2
(45) Date of Patent: Feb. 25, 2025

(54) BACKUP AND RECOVERY UNDER GROUP-LEVEL ENCRYPTION

(71) Applicant: SAP SE, Walldorf (DE)

(72) Inventor: Dirk Thomsen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/625,687

(22) Filed: Apr. 3, 2024

(65) Prior Publication Data
US 2024/0264910 A1   Aug. 8, 2024

Related U.S. Application Data

(63) Continuation of application No. 17/546,406, filed on Dec. 9, 2021, now Pat. No. 11,977,457.

(51) Int. Cl.
*G06F 11/14* (2006.01)
*G06F 21/60* (2013.01)
*G06F 21/64* (2013.01)

(52) U.S. Cl.
CPC ........ *G06F 11/1469* (2013.01); *G06F 21/602* (2013.01); *G06F 21/64* (2013.01); *G06F 2201/84* (2013.01)

(58) Field of Classification Search
None
See application file for complete search history.

(56) References Cited

U.S. PATENT DOCUMENTS

| | | |
|---|---|---|
| 2016/0147468 A1 | 5/2016 | Desai et al. |
| 2019/0129803 A1 | 5/2019 | Sakdeo et al. |
| 2022/0035785 A1 | 2/2022 | Vankamamidi et al. |

*Primary Examiner* — Eddy Cheung
(74) *Attorney, Agent, or Firm* — Fountainhead Law Group, PC

(57) ABSTRACT

Computer-readable media, methods, and systems are disclosed for processing backup and recovery of pages in an in-memory database system employing tenant-based, group-level encryption for a plurality of tenants. Page metadata for a page may be collected. The page may comprise a header and a set of page contents. The page metadata may be stored with the page header. When a backup request is received, the page may be loaded into a backup stream. The page may be loaded with the header unencrypted and the page contents encrypted. When a recovery request is received, the data page may be retrieved from the backup stream. A converter may be rebuilt using the page metadata. The data page may then be written to the main memory of the database system. The page contents may be decrypted by the converter.

20 Claims, 6 Drawing Sheets

BACKUP AND RECOVERY UNDER GROUP-LEVEL ENCRYPTION

CROSS REFERENCE TO RELATED APPLICATION

This application is a continuation of, and claims priority to, U.S. patent application Ser. No. 17/546,406, filed Dec. 9, 2021, the contents of which are incorporated herein by reference.

TECHNICAL FIELD

Embodiments generally relate to data encryption in a database management system, and more particularly to handling backup and recovery in connection with databases that employ group-level encryption to support multi-tenant data privacy.

Encryption of persisted in-memory database data is typically done at the level of a persisted data volume. Such data-volume-level encryption has the benefit of protecting the persisted data should physical access be improperly obtained to media containing the persisted database data. However, in the case of cloud-based, multi-tenant applications using an in-memory database, the data of multiple customers may be stored in a single in-memory database system. In such a case, the data for each customer in the multi-tenant application should be separately encrypted such that each individual customer has exclusive control over the customer's own encryption key(s), thereby ensuring group-level data privacy for the customer of a multi-tenant cloud-based application. Moreover, such group-level encryption and decryption processes should not require re-implementation of multi-tenant, cloud-based applications. Because data pages are entirely encrypted, recovering data pages from a backup proves difficult since the backup does not store a way to decrypt the data pages.

Accordingly, what is needed is a method for efficient and reliable backup and recovery of data pages using group-level encryption in an in-memory database with persistency, without requiring application redesign, thereby addressing the above-mentioned problems.

SUMMARY

Disclosed embodiments address the above-mentioned problems by providing one or more non-transitory computer-readable media storing computer-executable instructions that, when executed by a processor, perform a method for processing backup and recovery of pages in an in-memory database system employing tenant-based group-level encryption for a plurality of tenants, the method comprising retrieving page metadata for a data page, the data page comprising a header and a set of page contents, storing the page metadata with the header, responsive to receiving a backup request, loading the data page into a backup stream, responsive to receiving a recovery request for recovering the data page: retrieving the data page from the backup stream, rebuilding a converter using the page metadata, the converter configured to map logical page numbers from the data page to physical block numbers, the physical block numbers corresponding to a physical address, writing the data page into the main memory of the database system, and decrypting the set of page contents using the converter.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
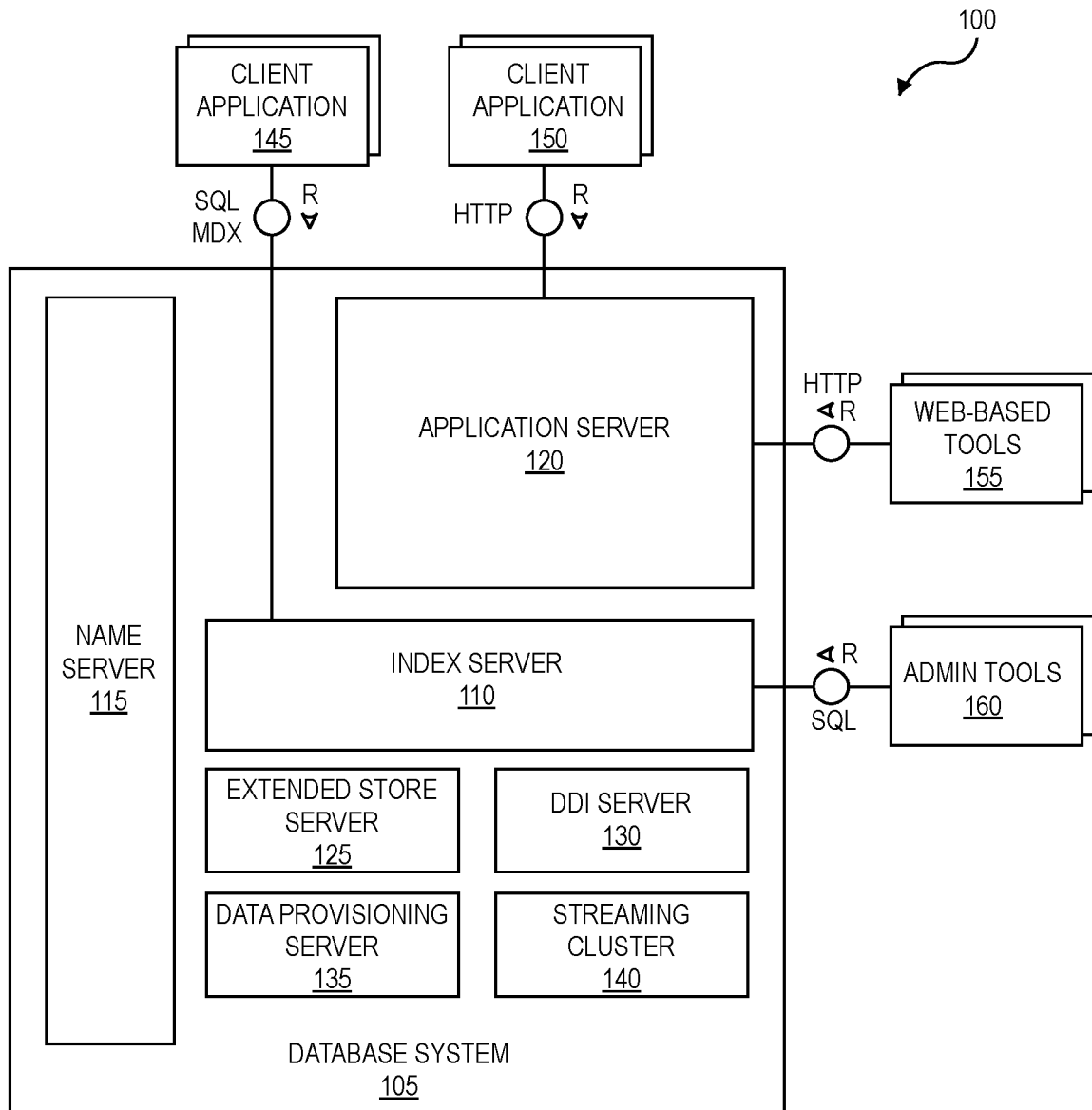
FIG. 1 is a system diagram illustrating an example database system for use in connection with the current subject matter.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In some cases, cloud-based, multi-tenant applications need to provide data privacy on a tenant-by-tenant basis, and in some cases a particular tenant has the requirement to be responsible for the tenant's own encryption keys so that even an operator of a cloud-based application or a data center in which the application is being hosted will not have access to the tenant's data. In some embodiments, to encrypt data on a tenant-by-tenant basis, encryption groups are employed. In some embodiments, each tenant is associated with its own encryption group. In some alternative embodiments, tenants share encryption groups. A data container is a logical unit of persistence which may be encrypted at a group-level. In some embodiments, each data container is assigned to a particular encryption group. Data within one encryption group is encrypted and decrypted with the same group-level encryption key. In some embodiments, metadata associated with each container includes an encryption group identifier corresponding to which encryption group with which the container is associated. In these embodiments, this is the container directory entry.

A converter is a data structure that maintains a mapping from logical page numbers to corresponding physical block numbers within one or more data volumes. In some embodiments, converter metadata associated with a converter stores a value corresponding to the encryption group that each data page belongs to within a converter entry in the converter metadata. The converter entry provides a mapping from logical page number to physical block number. In some embodiments, a database operation may require that a data container read in one or more data pages associated with the data container. In these embodiments, the data container provides a source of information regarding an association between an encryption group identifier and a page access function. In some embodiments, the corresponding encryption group identifier is used to decrypt the loaded group-level encrypted page content. The encryption group identifier is also stored within a transient page control block to be used for encrypting page content while flushing a page at such time as the page needs to be persisted after having been modified by a database operation. A transient page control block is an object that stores additional information for the page which is only needed for a limited amount of time. In some embodiments, a transient control page is a control block which is stored within a resource container and which holds a pointer to the actual in-memory representation of the page.

In some embodiments, only data page content is encrypted and/or decrypted with a corresponding group-level encryption key. By contrast, in these embodiments, the page header is not encrypted with the group-level encryption key. In some embodiments, the page header is encrypted with a data volume encryption key. In some alternative embodiments, the page header is unencrypted. The page header is not encrypted with the group-level encryption key so that that the information from the page header can be read for database internal operations such as backup and recovery and data volume resizing, where pages need to be accessed by the database system, but the corresponding user (tenant) content needs to remain encrypted with the group-level encryption key(s).

When backup is required, information on the backup media (e.g., the data pages) must stay encrypted. However, when recovering pages, the page headers must be accessible in order to rebuild the converter which may not be backed up with the data page. Data page metadata may be stored with the page header and may comprise an encryption group identifier, a savepoint version, information for generating an initialization vector, or a combination thereof. In some embodiments, the converter is used to decrypt the page content during recovery. In some embodiments, the data page content may be encrypted while the page header is left unencrypted to facilitate recovery operations. In some embodiments, a first and a second checksum are employed for backup and recovery operations. The first checksum may be calculated on the data page content during page flush before the data page content is encrypted. The second checksum may be performed on the entire data page after the data page content has been encrypted but before the page header has been encrypted. Both checksums may be stored during the backup operation. By storing the checksums during backup operation, the encrypted data page content may be verified during the backup and recovery operations.

When recovery is required, the data page metadata stored with the page header may be used to rebuild the converter as described above. Pages to be flushed during recovery may need to be flagged in the converter page control block such that they are treated differently by the flush than they would be during online operation because the data page content is already encrypted, leaving only the page header to be encrypted. Once the converter has been rebuilt, the data page contents may be decrypted, and the recovery process may proceed to completion.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

Turning first to FIG. 1, which depicts a diagram 100 illustrating a database system 105 that can be used to implement aspects of the present teachings. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120.

Index server 110 may contain in-memory data stores and engines for processing data. Index server 110 may also be accessed by remote tools (via, for example, SQL queries), that can provide various development environment and administration tools. Additional details regarding an example implementation of index server 110 is described and illustrated in connection with diagram 200 of FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
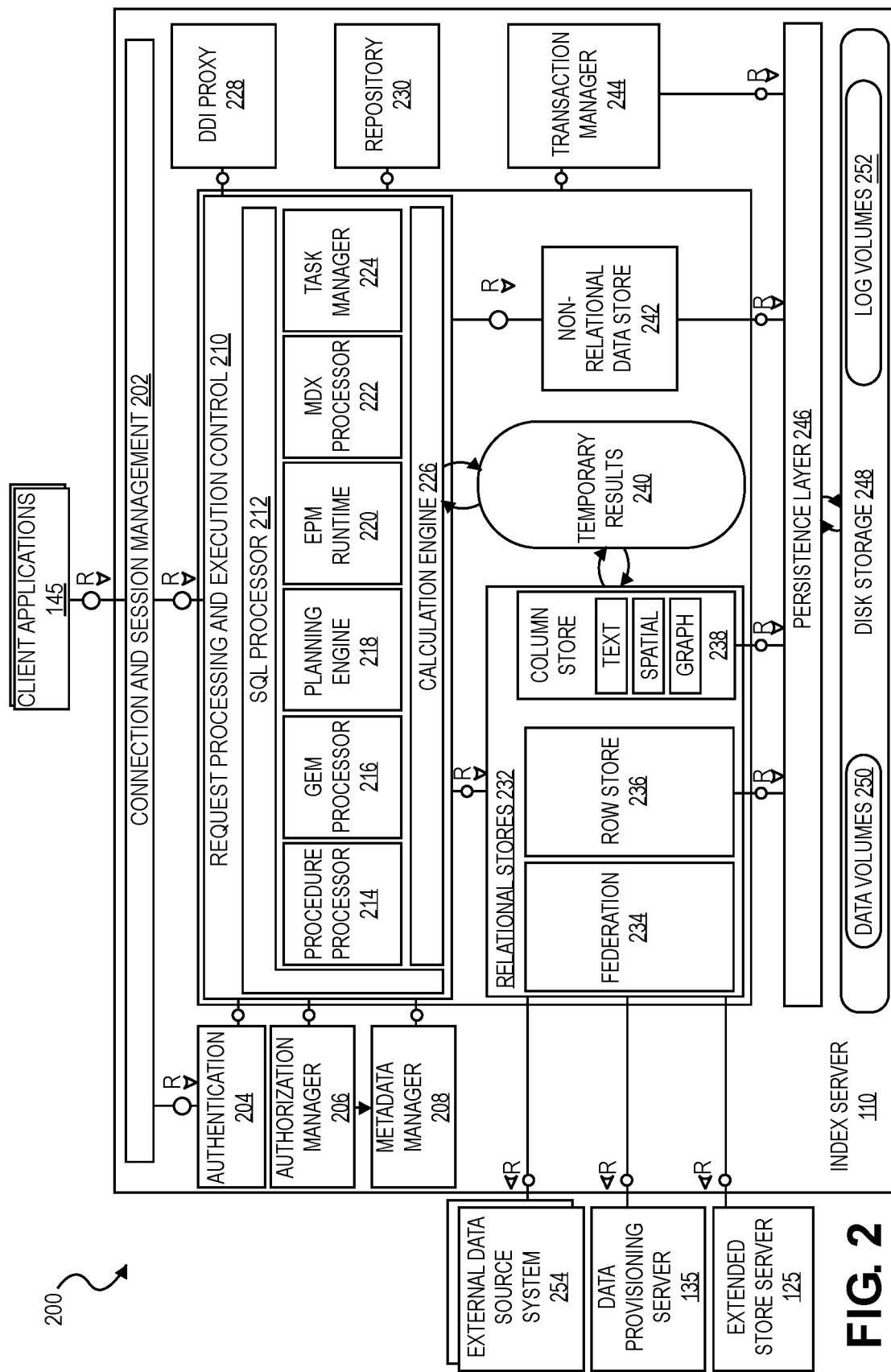
FIG. 2 is a diagram illustrating an architecture for an index server for use in connection with the current subject matter.

Turning now to FIG. 2, in which a diagram 200 illustrating an architecture for index server 110 is depicted. A connection and session management component 202 can create and manage sessions and connections for the client applications 145. For each session, a set of parameters can be maintained such as, for example, auto commit settings or the current transaction isolation level. Requests from the client applications 145 can be processed and executed by way of a request processing and execution control component 210. In various embodiments, database system 105 of FIG. 1 offers rich programming capabilities for running application-specific calculations inside the database system. In addition to SQL, MDX, and WIPE, database system 105 provides various programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by SQL processor 212 within the request processing and execution control component 210. Analytical applications may employ MDX language expressions, which may be evaluated in connection with MDX processor 222. For graph data, applications may employ GEM (Graph Query and Manipulation) via GEM processor 216, a graph query and manipulation language. In various embodiments, SQL statements and MDX queries may be sent over the same connection with the client application 145 using the same or similar network communication protocols. In some embodiments, GEM statements may be sent using a built-in SQL system procedure.

In various embodiments, index server 110 includes an authentication component 204 that can be invoked with a new connection with a client application 145 is established. Users can be authenticated either by the database system 105 itself (login with user and password) or authentication can be delegated to an external authentication provider. In some embodiments, authorization manager 206 can be invoked by other components of database system 105 to check whether a particular user has the required privileges to execute a requested operation. In various embodiments, requested operations in the form of statements or queries may be processed in the context of a transaction having a beginning and end so that any such transaction may be committed or rolled back. New sessions may be implicitly assigned to a new transaction. In various embodiments, index server 110 includes transaction manager 244 that coordinates transactions, controls transactional isolation, and keeps track of running and closed transactions. When a transaction is committed or rolled back, the transaction manager 244 can inform the involved engines about this event so they can execute necessary actions. Transaction manager 244 can provide various types of concurrency control and transaction manager 244 can cooperate with a persistence layer 246 to persist atomic and durable transactions.

In various embodiments, incoming SQL requests from client applications 145 are received by SQL processor 212. In some embodiments, data manipulation statements are executed by SQL processor 212 itself. In these embodiments, other types of requests are delegated to respective components for processing a corresponding type of request. Data definition statements can be dispatched to metadata manager 208, transaction control statements can be forwarded to transaction manager 244, planning commands can be routed to a planning engine 218, and task related commands can be forwarded to a task manager 224 (which can be part of a larger task framework). Incoming MDX requests can be delegated to the MDX processor 222. Procedure calls can be forwarded to the procedure processor 214, which further dispatches various calls, for example to a calculation engine 226, GEM processor 216, repository 230, or DDI proxy 228.

In various embodiments, index server 110 also includes planning engine 218 that enables implementation of planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

In various embodiments, SQL processor 212 includes an enterprise performance management (EPM) runtime component 220 that can form part of a larger platform providing an infrastructure for developing and running enterprise performance management applications in connection with database system 105. While planning engine 218 typically provides basic planning operations, in some embodiments, exemplary EPM platforms provide a foundation for complete planning applications, based on by application-specific planning models managed in connection with database system 105.

In various embodiments, calculation engine 226 provides a common infrastructure that implements various features such as SQL processing, SQLScript interpretation, evaluation of MDX and/or GEM, tasks, and execution of planning operations. In various embodiments SQL processor 212, MDX processor 222, planning engine 218, task manager 224, and GEM processor 216 can translate various corresponding programming languages, query languages, and models into a common representation that is optimized and executed by calculation engine 226. In various embodiments, calculation engine 226 implements those features using temporary results 240 which can be based, in part, on data within the relational stores 232.

Metadata can be accessed via metadata manager 208. Metadata, in this context, can comprise a variety of objects, such as definitions of relational tables, columns, views, indexes and procedures. In some embodiments, metadata of all such types can be stored in one common database catalog for all stores. In these embodiments, the database catalog can be stored in tables in row store 236 forming part of a group of relational stores 232. Other aspects of database system 105 including, for example, support and multi-version concurrency control can also be used for metadata management. In distributed systems, central metadata is shared across servers and metadata manager 208 can coordinate or otherwise manage such sharing.

In various embodiments, relational stores 232 provide a foundation for different data management components of index server 110. In these embodiments, relational stores can, for example, store data in main memory. In these embodiments, row store 236, column store 238, and federation component 234 are all relational data stores which can provide access to data organized in relational tables. Column store 238 can store relational tables column-wise (i.e., in a column-oriented fashion, etc.). Column store 238 can also comprise text search and analysis capabilities, support for spatial data, and operators and storage for graph-structured data. With regard to graph-structured data, from an application viewpoint, column store 238 could be viewed as a non-relational and schema-flexible, in-memory data store for graph-structured data. However, in various embodiments, such a graph store is not technically implemented as a separate physical data store. Instead, the graph store is built using column store 238, which may be provided in connection with a dedicated graph API.

In various embodiments, row store 236 stores relational tables row-wise. When a table is created, a creator specifies whether the table is to be row- or column-based. In various embodiments, tables can be migrated between the two storage formats of row- and column-based. While certain SQL extensions may be only available for one kind of table (such as the "merge" command for column tables), standard SQL may be used in connection with both types of tables. In various embodiments, index server 110 also provides functionality to combine both kinds of tables in one statement (join, sub query, union).

Federation component 234 can be viewed as a virtual relational data store. The federation component 234 can provide access to remote data in external data source system(s) 254 through virtual tables, which can be used in SQL queries in a fashion similar to normal tables. Database system 105 can include an integration of non-relational data store 242 into the index server 110. For example, the non-relational data store 242 can have data represented as networks of C++ objects, which can be persisted to disk or other persistent storage. Non-relational data store 242 can be used, for example, for optimization and planning tasks that operate on large networks of data objects, for example in supply chain management. Unlike row store 236 and column store 238, non-relational data store 242 does not use relational tables; rather, objects can be directly stored in containers provided by persistence layer 246. Fixed size entry containers can be used to store objects of one class. Persisted objects can be loaded via their persisted object identifiers, which can also be used to persist references between objects. In addition, access via in-memory indexes is supported. In that case, the objects need to contain search keys. In various embodiments, an in-memory search index is created on first access. Non-relational data store 242 can be integrated with the transaction manager 244 to extends transaction management with sub-transactions, and to also provide an alternative locking protocol and implementation of multi-version concurrency control.

An extended store is another relational store that can be used or otherwise form part of database system 105. In some embodiments, the extended store can, for example, be a disk-based column store optimized for managing very big tables, which tables are not meant to be kept in memory (as with relational stores 232). In various embodiments, the extended store can run in extended store server 125 separate from index server 110. Index server 110 can use the federation component 234 to send SQL statements to extended store server 125.

Persistence layer 246 is responsible for durability and atomicity of transactions. Persistence layer 246 can ensure that database system 105 is restored to a most recent committed state after a restart and that transactions are either completely executed or completely undone. To achieve this goal in an efficient way, persistence layer 246 can use a combination of write-ahead logs, undo and cleanup logs, shadow paging and save points. Persistence layer 246 can provide interfaces for writing and reading persisted data and it can also contain a logger component that manages a recovery log. Recovery log entries can be written in the persistence layer 246 (in recovery log volumes 252) explicitly by using a log interface or implicitly when using the virtual file abstraction. Recovery log volumes 252 can include redo logs which specify database operations to be replayed whereas data volume 250 contains undo logs which specify database operations to be undone as well as cleanup logs of committed operations which can be executed by a garbage collection process to reorganize the data area (e.g., free up space occupied by deleted data etc.).

Persistence layer 246 stores data in persistent disk storage 248 which, in turn, can include data volumes 250 and/or recovery log volumes 252 that can be organized in pages. Different page sizes can be supported, for example, between 4 KB and 16 MB. In addition, superblocks can also be supported which can have a larger size such as 64 MB and which can encapsulate numerous pages of different sizes. In various embodiments, database data is loaded from disk storage 248 and stored to disk page-wise. For read and write access, pages may be loaded into a page buffer in memory. Such a page buffer need not have a minimum or maximum size, rather, all free memory not used for other things can be used a page-buffer cache. If the memory is needed elsewhere, least recently used pages can be removed from the page-buffer cache. If a modified page is chosen to be removed, the page first needs to be persisted to disk storage 248. While the pages and the page-buffer cache are managed by persistence layer 246, the in-memory stores (i.e., the relational stores 232) can access data directly, within loaded pages.

As noted above, the data volumes 250 can include a data store that together with undo and cleanup log and recovery log volumes 252 comprise the recovery log. Other types of storage arrangements can be utilized depending on the desired configuration. The data store can comprise a snapshot of the corresponding database contents as of the last system save point. Such a snapshot provides a read-only static view of the database as it existed as of the point (i.e., time, etc.) at which the snapshot was created. Uncommitted transactions, at such time, are not reflected in the snapshot and are rolled back (i.e., are undone, etc.). In various embodiments, database snapshots operate at the data-page level such that all pages being modified are copied from the source data volume to the snapshot prior to their being modified via a copy-on-write operation. The snapshot can store such original pages thereby preserving the data records as they existed when the snapshot was created.

System save points (also known in the field of relational database servers as checkpoints) can be periodically or manually generated and provide a point at which the recovery log can be truncated. The save point can, in some variations, include an undo log of transactions which were open in the save point and/or a cleanup log of transactions which were committed in the save point but not yet garbage collected (i.e., data which has been deleted by these transactions has been marked as deleted but has not been deleted in a physical manner to assure multi-version concurrency control).

In some embodiments, a recovery log comprises a log of all changes to database system 105 since the last system save point, such that when a database server is restarted, its latest state is restored by replaying the changes from the recovery log on top of the last system save point. Typically, in a relational database system, the previous recovery log is cleared whenever a system save point occurs, which then starts a new, empty recovery log that will be effective until the next system save point. While the recovery log is processed, a new cleanup log is generated which needs to be processed as soon as the commit is replayed to avoid a growing data area because of deleted but not garbage collected data. In some embodiments, shadow pages that are designated to be freed are freed in connection with such a cleanup log. In some embodiments, a garbage collection process executes periodically to free data pages that are designated to be freed.

As part of a database system recovery/restart, after the save pointed state of data is restored, and before processing of the recovery log commences, all cleanup logs can be iterated through and, in implementations using a history manager, passed to the history manager for asynchronous garbage collection processing. In addition, it can be checked if there are older versions of the cleanup log present in the save point which need to be processed synchronously with regard to the recovery log. In such cases, recovery log processing can wait until garbage collection of old versions of cleanup logs finish. However, recovery log processing can commence when there are newer versions of cleanup logs for garbage collection. In cases in which no old versions of cleanup logs exist, recovery log replay can start immediately after the cleanup log from the save point has been passed to the history manager.

A typical save point can have three phases. First, in the pre-critical phase all modified pages in the relational stores 232 (which are loaded into memory) can be iterated through and flushed to the physical persistence disk storage 248. Second, a critical phase can block all parallel updates to pages in the relational stores 232 and trigger all the remaining I/O (i.e., I/O for pages still being modified when entering the critical phase) for the physical persistence disk storage 248 to ensure the consistent state of data. Lastly, a post-critical phase can wait for all remaining I/O associated with the physical persistence disk storage 248.

In various embodiments, database system 105 can be recovered after a failure or other error using information within the recovery log volumes 252 and the data volumes 250. As part of a recovery operation, pages from the backup storage 248 are streamed into the page-buffer cache in the main memory of database system 105. These pages can have different sizes from 4 KB to 16 MB, etc. For smaller page sizes, the write I/O can be slow (i.e., processing numerous small pages can create a bottleneck for a resource flushing thread, etc.). To overcome this restriction, in some variations, multiple pages can be filled in-memory into a superblock (which is a page of a different, larger size such as 64 MB), then the complete superblock can be written to disk 248.

In order to address the issues with write I/O, pages are copied into a superblock. When the database system 105 utilizes encryption for security purposes, each page is encrypted when the page is put into the superblock by a recovery channel (which is a single thread). Given that this operation is single threaded, the page-by-page encryption can be a bottleneck which can cause database recovery to require hours and/or days to complete.

For normal pages (i.e., non-superblocks, etc.), instead of encrypting such pages in the recovery channel, the pages can be encrypted when being flushed to the disk storage 248. With superblocks, additional information is required to encrypt each page. Within a recovery channel, the small pages are copied into a superblock and a control block (i.e., the superblock control block) is generated for the superblock. The control block can be a transient object that includes for each page such as an encryption key and an initialization vector (i.e., a fixed-size input to a cryptographic primitive that can be random or pseudorandom, etc.). When the superblock is filled with small pages, a resource flush thread, using a plurality of helper threads (e.g., 64 helper threads, etc.), encrypts the pages in the superblock in parallel using the information within the control block and causes the superblock to be flushed to disk storage 248.

Figure 3:
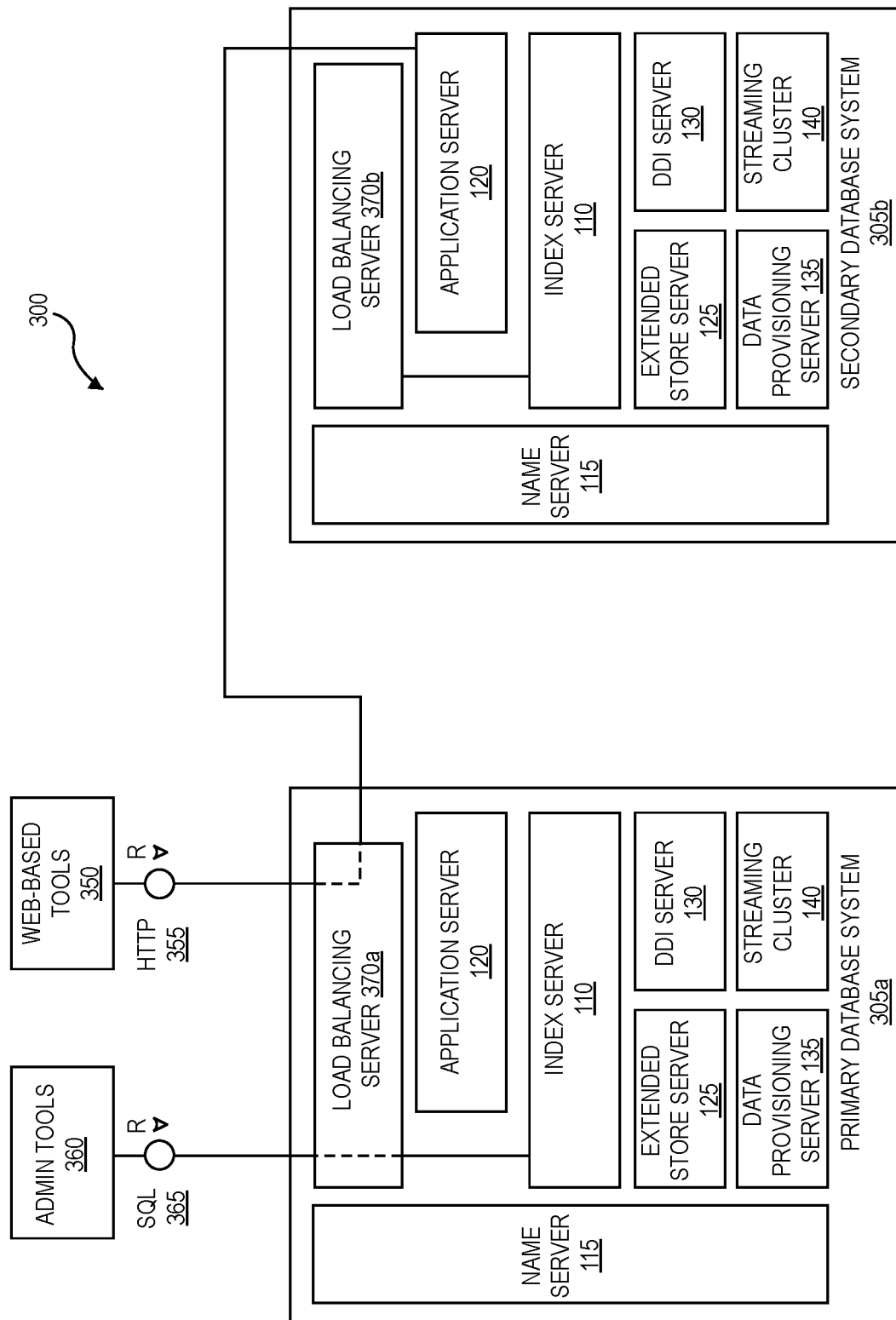
FIG. 3 is a functional flow diagram illustrating an architecture to support load balancing between a primary database system and a secondary database system.

Turning now to FIG. 3, in which a functional flow diagram is depicted, illustrating an architecture 300 to support load balancing between a primary database system 305a and a secondary database system 305b consistent with the present teachings. Each of the primary system 305a and the secondary system 305b may be a single instance system, similar to database system 105 depicted in FIG. 1, or each may be a distributed variation of database system 105. Such an architecture 300 may be useful in a high availability data system, or in a disaster recovery system, or in a combination high availability disaster recovery system.

Each of the primary system 305a and secondary system 305b may include a load balancing functionality. Such load balancing functionality may for example be contained within a distinct load balancing server 370a or 370b. But such load balancing functionality may be managed by any suitable processing system. For example, application server 120 of FIG. 1 may also manage the load balancing of requests issued to the application server of the primary system 305a, sending requests to the secondary system 305b as necessary to maintain a well-distributed workload.

As depicted in FIG. 3, each of the primary system 305a and the secondary system 305b includes load balancing server 370a and 370b which respectively receive requests from user applications directed to the primary system 305a or the secondary system 305b. Such request may come from either admin tools 360 or web-based tools 350, or any other user application. Upon receiving a request, a load balancing server, e.g., load balancing server 370a, determines how to distribute associated workload. As depicted, load balancing server 370a routes an SQL request 365 from admin tools 360 to index server 110 of primary system 305a, while routing an HTTP request 355 from web-based tools 350 to application server 120 of secondary system 305b.

Load balancing of resources between primary system 305a and secondary system 305b may give rise to several complicating issues. For example, if either of requests 355, 365 requires writing to one or more data tables, or modifying a data table, then the two systems 305a, 305b may diverge. After many instances of write requests being distributed between primary system 305a and secondary system 305b, the two systems would be substantially inconsistent, and likely unsuitable as replacements for each other. In another example, an application request, e.g., 365, may perform a write transaction that is followed by a read transaction, e.g., 355, related to the data written by the write request 365. If the write request is allocated to the primary system 305a, the read request would obtain a different result depending on whether the subsequent read transaction is carried out by the primary system 305a or by the secondary system 305b.

Load balancing in a combination high availability disaster recovery system, by distributing a portion of the workload of a primary data system to a hot-standby or backup system should be carried out in a manner that would not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications. In some embodiments, snapshots may be employed to facilitate database system replication.

Figure 4A:
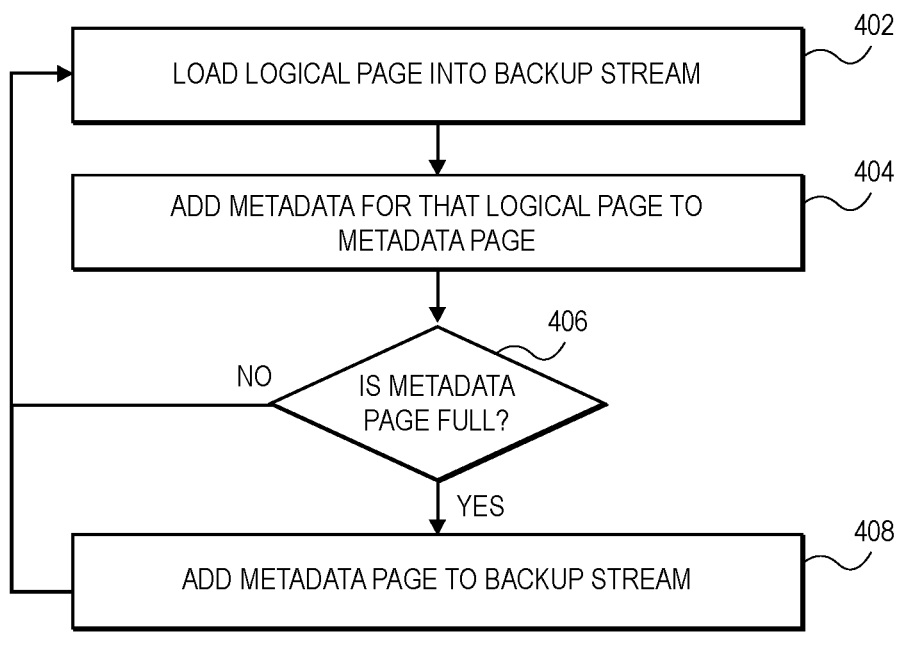
FIG. 4A is a process flow diagram illustrating methods for backup of data pages in connection with databases that employ group-level encryption to support multi-tenant data privacy consistent with various embodiments.

Turning now to FIG. 4A which illustrates process 400 in which exemplary methods are depicted for backup in connection with a database that employs group-level encryption. To facilitate recovery operations, the components of the data page, i.e., the header and the page contents, may be handled individually. Recovery may be used to completely reinitialize a backed-up database from scratch. In some embodiments, the header is data volume encrypted, and the page contents are group-level encrypted. As described above, the converter is required for decrypting the page contents. When recovery is initiated, rebuild of the converter may be required. In order to rebuild the converter, the header may need to be accessed. Consequently, when backing up pages, the header may be sent unencrypted such that recovering the backup will produce an unencrypted header. Thereafter, the converter may be reconstructed from the header and used to decrypt the page contents. For group-level encryption, additional metadata may be required along with the header to restore the backup. In some embodiments, the page header comprises an additional bit indicative of whether the page is encrypted using group-level encryption. In some embodiments, the backup media to which the data page is sent is itself encrypted to protect the privacy of the unencrypted page header.

At step 402, a logical page may be loaded into the backup stream. In some embodiments, the backup stream comprises a physical medium (e.g., disks, tapes, etc.) to which the data is stored. In some embodiments, the backup stream is associated with any of the above-described databases or may be requisitioned from a third-party provider. The backup media may be encrypted using any encryption technique in order to protect the privacy of the data page. In some embodiments, the page contents are filled using a memory copy.

Thereafter, at step 404, metadata for the logical page may be added to a metadata page. The metadata page may comprise metadata for a plurality of logical pages, and each data page may comprise an associated set of page metadata. The page metadata may comprise information necessary to decrypt the data page when recovering. In some embodiments, the page metadata comprises the logical page number for the page which serves as the key for the metadata to be stored with. In some embodiments, the page metadata comprises the encryption group identifier, a savepoint version with which the page was written, and information necessary to build the initialization vector. In some embodiments, the savepoint version is stored with the page header and, as such, may not be stored with the page metadata. Similarly, the savepoint version may be required in the case of key rotations. The savepoint version may be stored as part of the header and/or as part of a converter entry of the converter. The savepoint version may be indicative of the encryption key used for the data page. Lastly, the initialization vector used to decrypt the page contents (or information to rebuild the initialization vector) may be stored as metadata. In some embodiments, the initialization vector is representative of a converter entry of the converter. The initialization vector may be group-level specific. In some embodiments, the information for generating the initialization vector comprises the logical page number and the savepoint version with which the page was written. In some embodiments, data pages are backed up in an order of descending size, with the largest data pages accessed and processed first.

Next, at step 406, it may be determined whether the metadata page is full. If the metadata page is full, processing may proceed to step 408. If the metadata page is not full, processing may proceed back to step 402. Upon returning to step 402, if there are no logical pages remaining, process 400 may end. In some embodiments, the metadata is stored in 4*k* or 16M pages, or any size therebetween. At step 408, whereby the metadata page is full, the metadata page may be added the backup steam. Processing may then proceed back to step 402 until, all logical pages have been processed. At this point, the remaining metadata page (which may not necessarily be full) may be added to the backup stream.

Figure 4B:
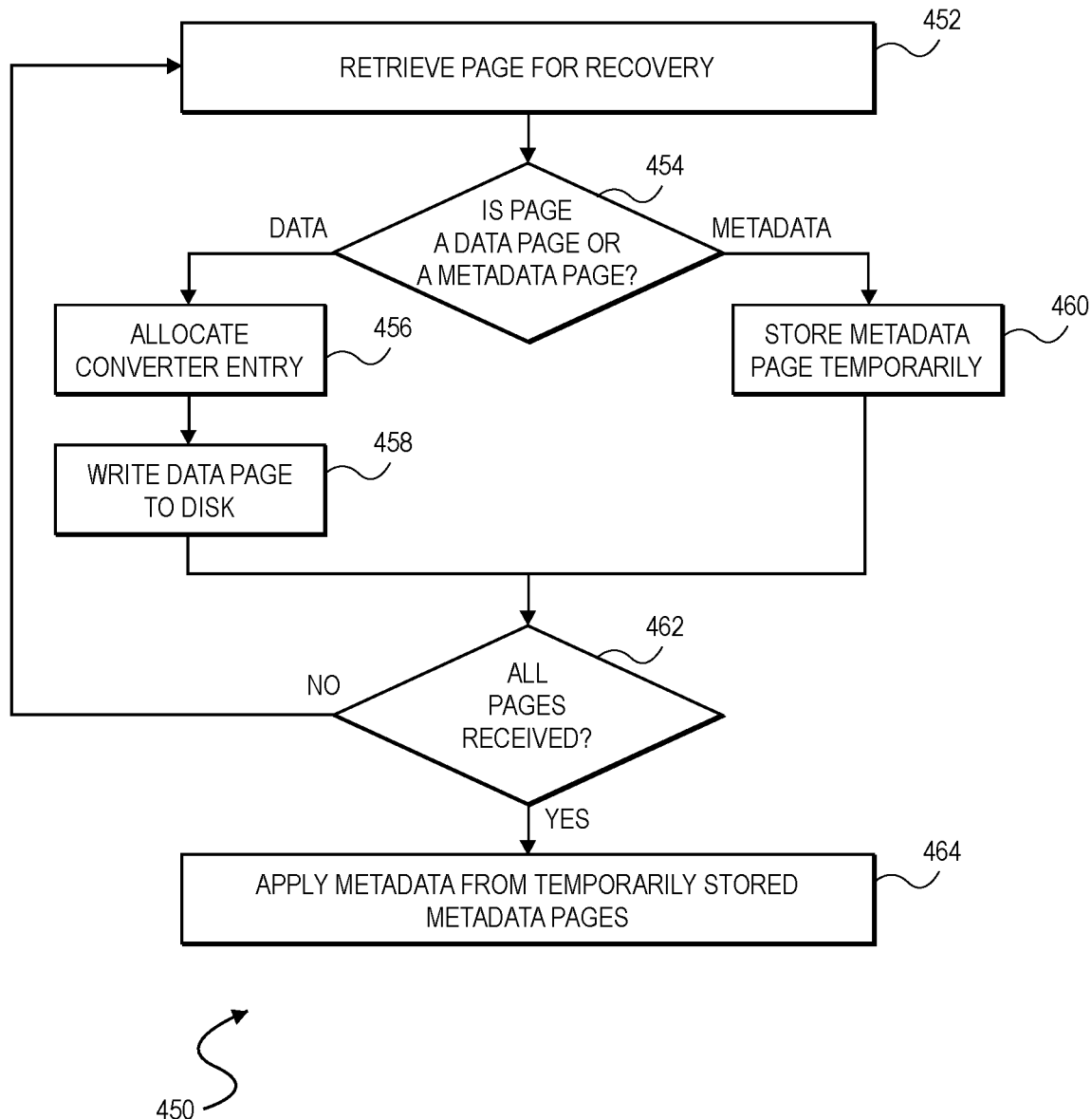
FIG. 4B is a process flow diagram illustrating methods for recovery of data pages in connection with databases that employ group-level encryption to support multi-tenant data privacy consistent with various embodiments.

Turning now to FIG. 4B, illustrating process 450 in which exemplary methods are depicted for recovery in connection with a database that employs group-level encryption. At step 452, a page may be retrieved for recovery. The page may be either a data page or a metadata page. Recovery may be manually initiated or performed automatically in response to a detected database failure or the like. Recovery and/or backup may be done with parallel streams, with one stream for the metadata information and a second stream for the page contents. Alternatively, or additionally, there may be many parallel streams with each stream comprising both data pages and metadata pages. In some embodiments, retrieving one or more pages from a backup stream occurs asynchronously as individual pages are provided by any number of types of backup media. Writing may comprise allocating the page in the main memory of the database, specifying a logical page number for the data page, filling the page with the corresponding page contents, and adding the page to a flush queue. The logical page number is the page number stored in the page header.

Next, at step 454, it may be determined whether the retrieved page is a data page or a metadata page. This determination may be done by examining the page header in which a page type is stored. As described above, the page header is backed-up unencrypted and, as such, the page type may be determined from the page header. If the retrieved page is a data page, processing may proceed to step 456. If the received page is a metadata page, processing may proceed to step 460.

At step 456, whereby the retrieved page is a data page, a converter entry may be allocated therefor. The allocated converter entry may be an incorrect converter entry for decrypting the data page. As such, at this point, the data page may be written but not decrypted/read at this point if the associated metadata has yet to be retrieved. After allocating the converter entries, the converter may be rebuilt but not all fields thereof may be filled correctly. Thereafter, at step 458, the data page may be written to disk. Because the page contents are stored encrypted, they may not need to be encrypted when written to disk for recovery. Writing of the data page may be done using the same savepoint version that was used for the backup copy. By writing the data page with the original savepoint, the correct encryption key may be determined after recovery because the encryption key is dependent upon the savepoint version. The page contents may be written directly to disk if the contents are encrypted during recovery. The data page may be flushed and written to disk. In some embodiments, a plurality of flush threads is utilized. A flush queue may be utilized comprising one or more flush threads. Processing may then proceed to step 462.

At step 460, whereby the page retrieved at step 452 was a metadata page, the metadata be stored in temporary memory. As such, a temporary converter (i.e., a temporary page access) may be used to store retrieved metadata for building the converter. Further, because the order with which data pages and metadata pages are retrieved cannot be guaranteed (because of the use of parallel streams), the temporary converter allows for storing the metadata pages until an associated data page is received such that the metadata information may be applied thereto. Metadata may be stored in the temporary converter and, if it is unclear whether the page information or the metadata was retrieved first, the metadata may be held in the temporary converter until an accurate determination can be made. In some embodiments, data in the temporary converter can be flushed to disk in the case of memory pressure, i.e., if the server's memory consumption is approaching a predetermined threshold.

Next, at step 462, it may be determined if all pages (i.e., data pages and metadata pages) have been retrieved from the backup stream. If all pages have not been received, processing may proceed back to step 452 whereby another page is retrieved for recovery. If all the pages have been retrieved, processing may proceed to step 464 whereby the metadata stored in the temporary converter may be applied at converter entries in order to rebuild the converter. As described above the which metadata to apply to which converter entry may be determined by the logical page number. As previously explained, the converter may be a data structure comprising a plurality of converter entries, wherein each converter entry provides a mapping from logical page number to physical block number. Consequently, in order to rebuild the converter, the converter entries may need to be reconstructed using the page metadata (i.e., the encryption group identifier and the initialization vector) for each data page. In some embodiments, the converter may be rebuilt based in part on the logical page numbers stored with the data page metadata. The incorrectly-filled portions of the converter may then be correctly filled in using the page metadata. In some embodiments, the converter is implemented as a tree data structure. Once the converter is rebuilt, the entire data page may now be decrypted and accessible for a viewer to use.

Figure 5:
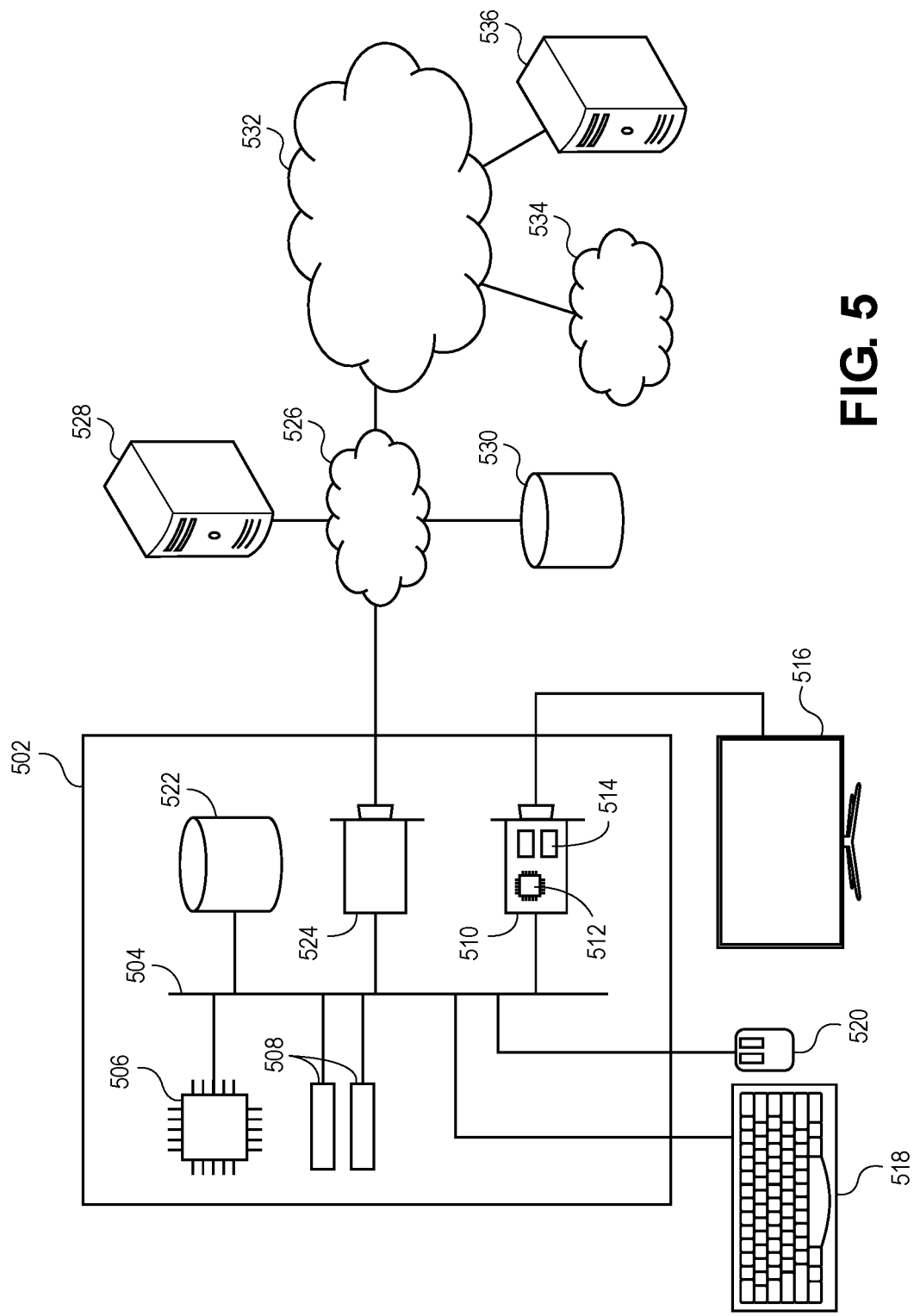
FIG. 5 is a diagram illustrating a sample computing device architecture for implementing various aspects described herein.

Turning now to FIG. 5, in which an exemplary hardware platform for certain embodiments is depicted. Computer 502 can be a desktop computer, a laptop computer, a server computer, a mobile device such as a smartphone or tablet, or any other form factor of general- or special-purpose computing device containing at least one processor. Depicted with computer 502 are several components, for illustrative purposes. In some embodiments, certain components may be arranged differently or absent. Additional components may also be present. Included in computer 502 is system bus 504, via which other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also, on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, such as non-transitory computer readable media, and may be internally installed in computer 502 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the Institute of Electrical and Electronics Engineers (IEEE) 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over public Internet 532. Local network 526 is in turn connected to public Internet 532, which connects many networks such as local network 526, remote network 534 or directly attached computers such as computer 536. In some embodiments, computer 502 can itself be directly connected to public Internet 532.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers.

A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method, the method comprising:

storing a data page and at least a first checksum and a second checksum in a backup database, the data page comprising a header and page contents, wherein the page contents are group-level encrypted page contents, and wherein the header includes metadata for decrypting the group-level encrypted data page;

receiving a recovery request for the data page;

retrieving the header, unencrypted, and the group-level encrypted page contents corresponding to the data page from the backup database based on the recovery request;

accessing the metadata in the header;

building a converter based on the metadata, the converter configured to decrypt the page contents to produce unencrypted page contents;

performing a first checksum on the unencrypted page contents; and performing a second checksum on the page contents, encrypted, and the header, unencrypted, wherein the first checksum and second checksum verify the page content.

2. The non-transitory computer-readable media of claim 1, wherein the metadata comprises an encryption group identifier for the data page.

3. The non-transitory computer-readable media of claim 1, wherein the metadata comprises a savepoint version for the data page.

4. The non-transitory computer-readable media of claim 3, wherein the metadata uses the savepoint version and a logical page number to generate an initialization vector configured to decrypt the page contents.

5. The non-transitory computer-readable media of claim 1, wherein the converter is a data structure that maintains a mapping from logical page numbers to corresponding physical block numbers.

6. The non-transitory computer-readable media of claim 1, wherein the page content and metadata are transmitted from the backup database to an in-memory database over different data streams.

7. The non-transitory computer-readable media of claim 1, further comprising flagging data pages to be flushed during recovery to process the flagged data pages different than processing of data pages during online operation.

8. A method for processing backup and recovery of pages in an in-memory database system employing tenant-based, group-level encryption for a plurality of tenants, the method comprising:

storing a data page and at least a first checksum and a second checksum in a backup database, the data page comprising a header and page contents, wherein the page contents are group-level encrypted page contents, and wherein the header includes metadata for decrypting the group-level encrypted data page;

receiving a recovery request for the data page;

retrieving the header, unencrypted, and the group-level encrypted page contents corresponding to the data page from the backup database based on the recovery request;

accessing the metadata in the header;

building a converter based on the metadata, the converter configured to decrypt the page contents to produce unencrypted page contents;

performing a first checksum on the unencrypted page contents; and performing a second checksum on the page contents, encrypted, and the header, unencrypted, wherein the first checksum and second checksum verify the page content.

9. The method of claim 8, wherein the metadata comprises an encryption group identifier for the data page.

10. The method of claim 8, wherein the metadata comprises a savepoint version for the data page.

11. The method of claim 10, wherein the metadata uses the savepoint version and a logical page number to generate an initialization vector configured to decrypt the page contents.

12. The method of claim 8, wherein the converter is a data structure that maintains a mapping from logical page numbers to corresponding physical block numbers.

13. The method of claim 8, wherein the page content and metadata are transmitted from the backup database to an in-memory database over different data streams.

14. The method of claim 8, further comprising flagging data pages to be flushed during recovery to process the flagged data pages different than processing of data pages during online operation.

15. A system for processing backup and recovery of pages, the system comprising:

at least one processor; and at least one non-transitory memory storing computer executable instructions that when executed by the at least one processor cause the system to carry out actions comprising:

storing a data page and at least a first checksum and a second checksum in a backup database, the data page comprising a header and page contents, wherein the page contents are group-level encrypted page contents, and wherein the header includes metadata for decrypting the group-level encrypted data page;

receiving a recovery request for the data page;

retrieving the header, unencrypted, and the group-level encrypted page contents corresponding to the data page from the backup database based on the recovery request;

accessing the metadata in the header;

building a converter based on the metadata, the converter configured to decrypt the page contents to produce unencrypted page contents;

performing a first checksum on the unencrypted page contents; and performing a second checksum on the page contents, encrypted, and the header, unencrypted, wherein the first checksum and second checksum verify the page content.

16. The system of claim 15, wherein the metadata comprises an encryption group identifier for the data page.

17. The system of claim 15, wherein the metadata comprises a savepoint version for the data page.

18. The system of claim 17, wherein the metadata uses the savepoint version and a logical page number to generate an initialization vector configured to decrypt the page contents.

19. The system of claim 15, wherein the converter is a data structure that maintains a mapping from logical page numbers to corresponding physical block numbers.

20. The system of claim 15, wherein the page content and metadata are transmitted from the backup database to an in-memory database over different data streams.

* * * * *